(12) United States Patent
Asterjadhi et al.

(10) Patent No.: US 10,484,159 B2
(45) Date of Patent: Nov. 19, 2019

(54) METHODS AND SYSTEMS FOR ACKNOWLEDGMENT CONFIGURATION

(71) Applicant: QUALCOMM Incorporated, San Diego, CA (US)

(72) Inventors: Alfred Asterjadhi, San Diego, CA (US); George Cherian, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 15/605,836

(22) Filed: May 25, 2017

(65) Prior Publication Data

US 2017/0373813 A1 Dec. 28, 2017

Related U.S. Application Data

(60) Provisional application No. 62/354,644, filed on Jun. 24, 2016.

(51) Int. Cl.

| | |
|---|---|
| *H04L 5/00* | (2006.01) |
| *H04L 29/06* | (2006.01) |
| *H04L 1/16* | (2006.01) |
| *H04L 29/12* | (2006.01) |
| *H04W 24/02* | (2009.01) |
| *H04L 29/08* | (2006.01) |

(Continued)

(52) U.S. Cl.
CPC .......... *H04L 5/0055* (2013.01); *H04L 1/1621* (2013.01); *H04L 61/6022* (2013.01); *H04L 69/04* (2013.01); *H04L 69/22* (2013.01); *H04L 69/324* (2013.01); *H04W 24/02* (2013.01); *H04W 28/06* (2013.01); *H04W 88/12* (2013.01)

(58) Field of Classification Search
CPC ...... H04L 5/005; H04L 69/324; H04W 24/02; H04W 28/06
See application file for complete search history.

(56) References Cited

U.S. PATENT DOCUMENTS

| | | | |
|---|---|---|---|
| 9,525,520 B2 * | 12/2016 | Asterjadhi | H04W 28/04 |
| 2012/0084616 A1 * | 4/2012 | Wentink | H04L 1/1614 |
| | | | 714/748 |

(Continued)

FOREIGN PATENT DOCUMENTS

WO WO-2016022431 A1 2/2016

OTHER PUBLICATIONS

International Search Report and Written Opinion—PCT/US2017/034758—ISA/EPO—Jul. 27, 2017.

*Primary Examiner* — George C Atkins
*Assistant Examiner* — Ryan C Kavleski
(74) *Attorney, Agent, or Firm* — Paradice and Li LLP

(57) ABSTRACT

Methods, apparatus, and systems disclosed provide for the configuration of acknowledgments of data. In some aspects, a method includes generating an aggregated media access control (MAC) protocol data unit (A-MPDU) frame, comprising a media access control protocol data unit (MPDUs), the media access control protocol data unit (MPDUs) comprising a media access control (MAC) header and data, wherein the media access control (MAC) header comprises an indication of an acknowledgment type for the data of the MPDU; and transmitting the A-MPDU onto a wireless network.

24 Claims, 13 Drawing Sheets

(51) Int. Cl.
    *H04W 28/06*     (2009.01)
    *H04W 88/12*     (2009.01)

(56) References Cited

U.S. PATENT DOCUMENTS

| | | | |
|---|---|---|---|
| 2014/0032798 A1* | 1/2014 | Trainin | H04L 1/1621 710/56 |
| 2015/0146648 A1 | 5/2015 | Viger et al. | |
| 2016/0043946 A1* | 2/2016 | Merlin | H04L 45/74 370/392 |
| 2016/0119455 A1* | 4/2016 | Stacey | H04L 69/324 370/336 |
| 2016/0182205 A1* | 6/2016 | Asterjadhi | H04L 5/0055 370/329 |
| 2017/0063509 A1* | 3/2017 | Kim | H04L 5/0055 |
| 2018/0124858 A1* | 5/2018 | Gan | H04W 72/04 |
| 2018/0316476 A1* | 11/2018 | Sugaya | H04L 29/08 |
| 2019/0089519 A1* | 3/2019 | Nabetani | H04L 5/1469 |

\* cited by examiner

| BAR TID n subfield value | Definition |
|---|---|
| 0 | No Implicit BAR for TID |
| 1 | Request Ack for each MPDU for TID |
| 2 | Implicit BAR for TID<br>Request Block Acq with 32 octets for acknowledgment |
| 3 | Implicit BAR for TID<br>Request Block Acq with 64 octets for acknowledgment |
| 4 | Implicit BAR for TID<br>Request Block Acq with 128 octets for acknowledgment |
| 5 | Implicit BAR for TID<br>Request Block Acq with 256 octets for acknowledgment |
| 6 | Implicit BAR for TID<br>Request Block Acq with 64 octets for acknowledgment<br>Fragmentation Level 3 is on |
| 7 | Reserved or<br>Request Block Acq with 256 octets for acknowledgment<br>Fragmentation for Level 3 is on |

FIG. 8

US 10,484,159 B2

METHODS AND SYSTEMS FOR ACKNOWLEDGMENT CONFIGURATION

CROSS REFERENCE TO RELATED APPLICATIONS

This application claim priority to U.S. Provisional Patent Application No. 62/354,644, filed Jun. 24, 2016 and entitled "METHODS AND SYSTEMS FOR ACKNOWLEDGMENT CONFIGURATION." The content of this prior application is considered part of this application, and is hereby incorporated by reference in its entirety.

FIELD

The present application relates generally to wireless communications, and more specifically to systems, methods, and devices for communicating control information.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. In some aspects, devices may transmit control information in order to better facilitate communication between the devices. However, in some aspects, such information may increase overhead and reduce efficiency. Accordingly, there is a need for improved methods and devices for communicating such information between devices.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention allow for efficient use of the wireless communication medium.

Some current methods perform a prior negotiation of block acknowledgment configurations, for example, during an initial setup process, in advance of data transfer. This solution suffers from several problems. First, an actual PPDU size may be relatively small, for example, less than thirty two (32) bytes. Thus, an acknowledgement capable of covering a large number of MPDUs may be longer than necessary, resulting in inefficient use of network bandwidth.

Second, a device in communication with several other devices may experience different negotiated block acknowledgment lengths amount the several other devices. This may require the device to consult a database or other memory structure after receiving a message from a particular device but before sending an acknowledgment, to ensure its response conforms with the negotiated format.

The disclosed methods and systems solve the above problems by enabling a transmitter of data to define the configuration of an acknowledgment of that data in the data message itself, or at least outside the block acknowledgment negotiation process. Furthermore, the disclosed methods and systems may pad an multi TID acknowledgment message, potentially including both acknowledgment indications and block acknowledgment indications, if MPDUs are received correctly and the configured acknowledgment type is set to acknowledgment (and not block acknowledgment).

BRIEF DESCRIPTION OF THE DRAWINGS

FIG. 8 provides exemplary values and definitions for the sub-fields discussed above with respect to FIG. 7.

DETAILED DESCRIPTION

Figure 1:
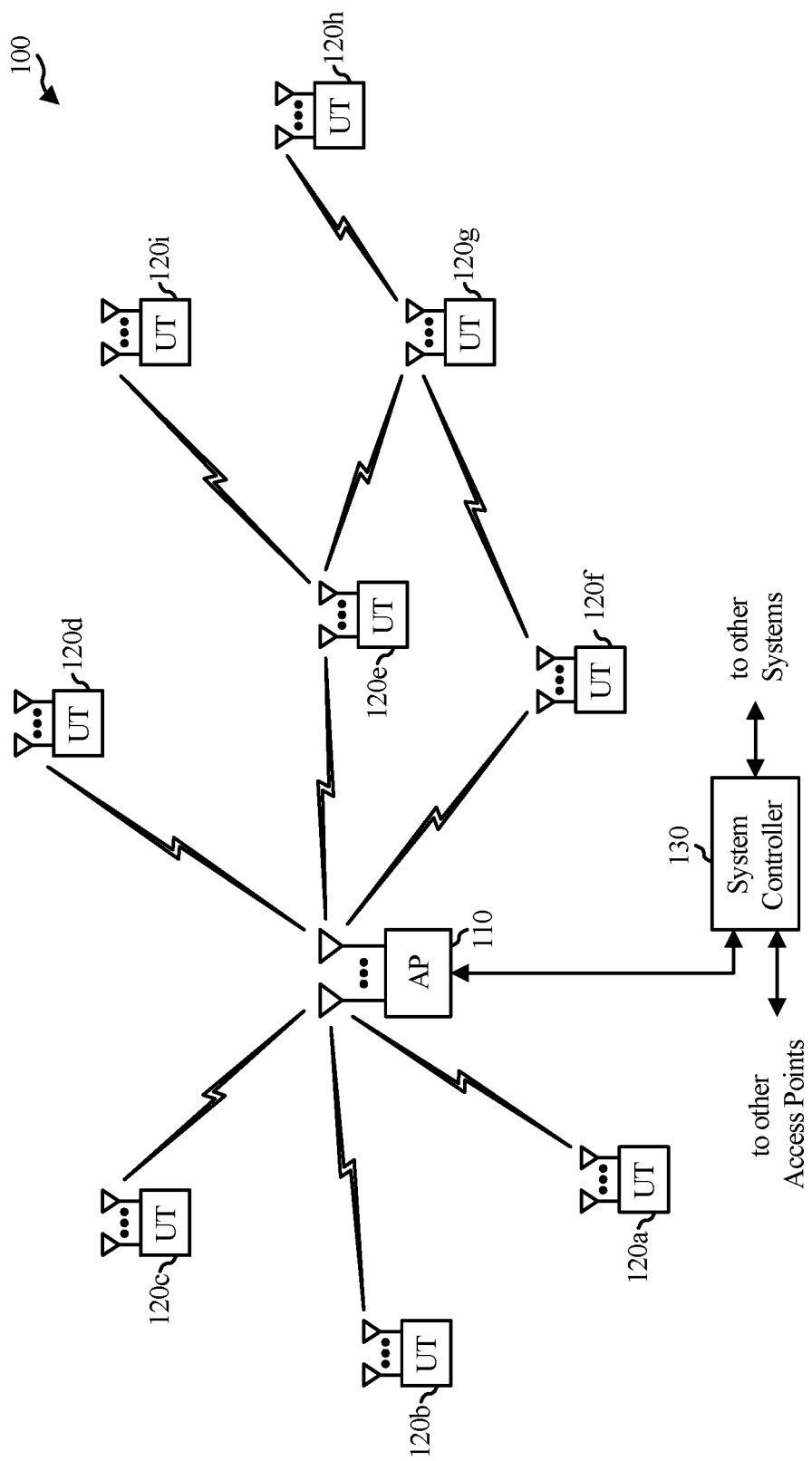
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which are the components that access the wireless network. For example, there may be two types of devices: access points ("APs") and clients (also referred to as stations, commonly known as "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \leq K \leq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
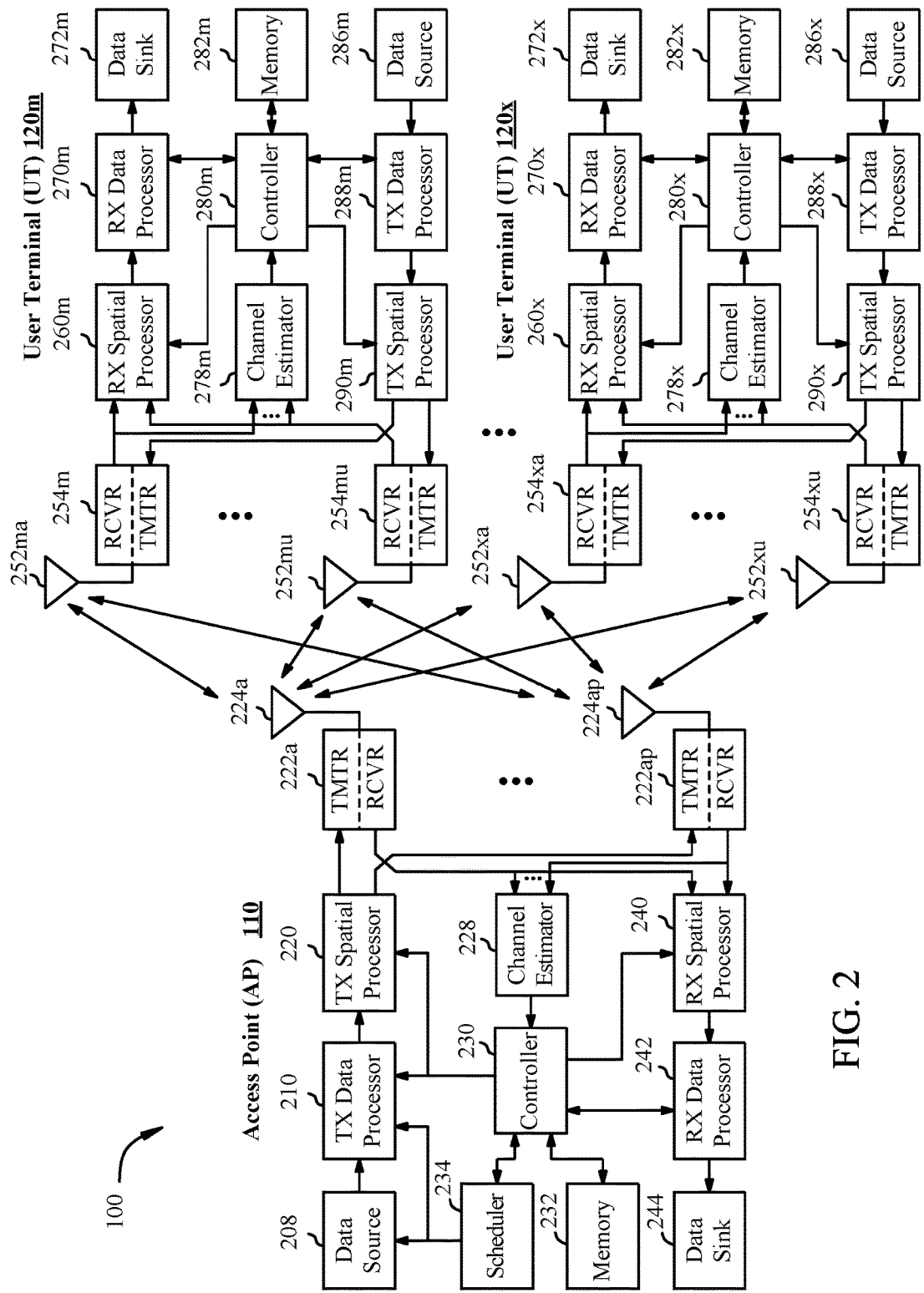
FIG. 2 illustrates a block diagram of the access point 110 and two user terminals 120$m$ and 120$x$ in a MIMO system.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
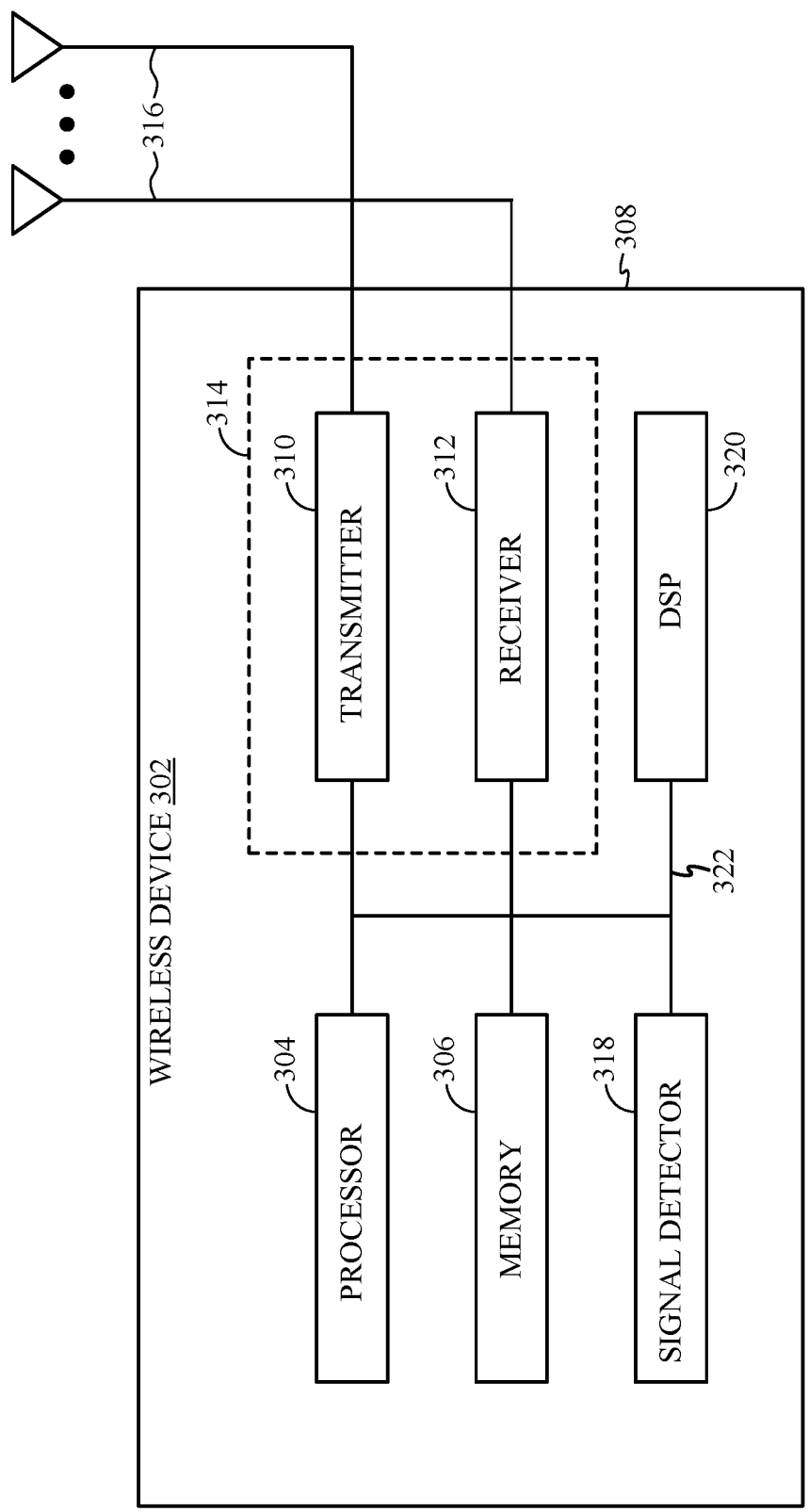
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In some aspects, a wide range of control information may be exchanged between STAs and/or APs using an 802.11 protocol. For example, STAs may exchange buffer status (BS) feedback, channel quality information feedback, resource allocation, power save (PS) feedback, etc. in order to facilitate more efficient communication between wireless devices. This control information may be required to be signaled somewhere within exchanged frames between the STAs and/or APs. In some aspects, including this information in various containers (e.g., frames, element, fields) may add to design complexity. Additionally, including this control information in an aggregation of multiple types of frames (e.g., control, management, data, etc.) may increase medium access control (MAC) MAC overhead. Accordingly, it may be beneficial to define a new type of control field in a MAC frame in order to better exchange such control information. In such a new type of control field, the control field may comprise one or more control fields carrying a variety of control information in one or more MAC frames. In addition, the new type of control field may indicate the end of the one or more control frames and may be generated to include a variable amount of information in each control field.

Figure 4:
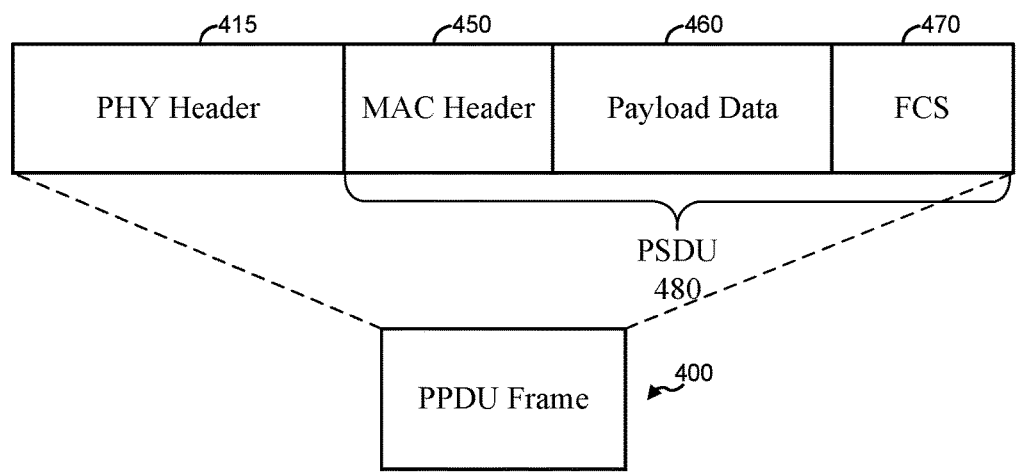
FIG. 4 is a diagram illustrating an exemplary embodiment of a physical layer convergence procedure (PLCP) protocol data unit (PPDU) frame.

FIG. 4 is a diagram illustrating an exemplary embodiment of a physical layer convergence procedure (PLCP) protocol data unit (PPDU) frame 400. As shown in FIG. 4, the PPDU frame 400 comprises a physical layer (PHY) header 415 and a PLCP service data unit (PSDU) 480 comprising a MAC header field 450, a payload data field 460, and a frame check sequence (FCS) field 470. The PSDU 480 may also be referred to as a payload portion 480 of the PPDU 400. The PHY header 415 may be used to acquire an incoming OFDM signal, to train and synchronize a demodulator, and may aid in demodulation and delivery of the payload portion 480.

Figure 5:
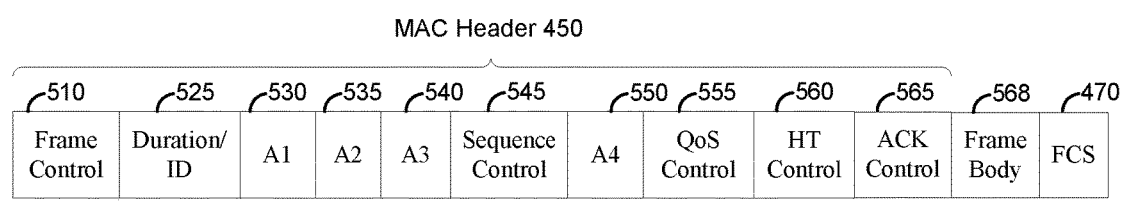
FIG. 5 is a diagram illustrating an exemplary embodiment of a media access control (MAC) frame.

FIG. 5 is a diagram illustrating an exemplary embodiment of a media access control (MAC) frame 500. In some embodiments, the MAC frame 500 may comprise a media access control protocol data unit (MPDU) frame. In some embodiments, the MAC frame 500 may correspond to the payload portion 480, as previously described in connection with FIG. 4. As shown, the MAC frame 500 includes 12 different fields: a frame control (fc) field 510, a duration/identification (dur) field 525, a receiver address (a1) field 530, a transmitter address (a2) field 535, a destination address (a3) field 540, a sequence control (sc) field 545, a fourth address (a4) field 550, a quality of service (QoS) control (qc) field 555, a high throughput (HT)/very high throughput (VHT) control field 560, an acknowledgment (ACK) control field 565, a frame body 568, and a frame check sequence (FCS) field 470. Some or all of the fields 510-565 may make up the MAC header 450 of FIG. 4. In some embodiments, a protocol version field of the frame control field 510 of the MAC frame 500 can be 0, or 1 or greater than 1.

Figure 6:
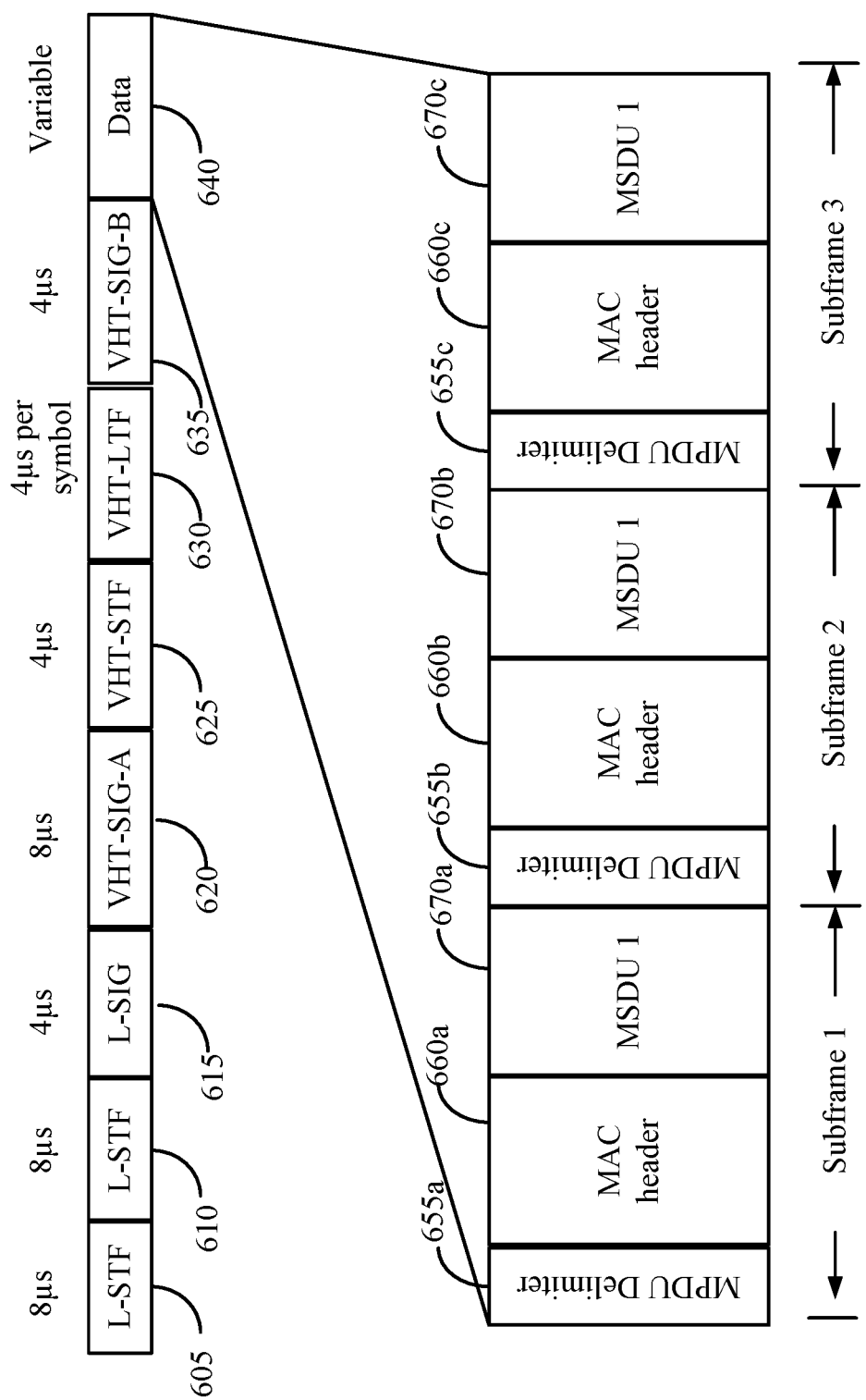
FIG. 6 shows an exemplary format of an aggregated media access control (MAC) protocol data unit (A-MPDU).

FIG. 6 shows an exemplary format of an aggregated media access control (MAC) protocol data unit (A-MPDU). The A-MPDU 600 includes a preamble that include a first legacy short training field 605, second legacy short training field 610, a legacy signal field 615, a very high throughput (HVT) signal-A (SIG-A) field 620, a VHT-short training field (STF) 625, a VHT long training field (LTF) and a VHT signal-B (SIG-B) field 635. The A-MPDU 600 also includes a data field 640.

The data field 640 may be formatted into one or more MPDUs. In the illustrated aspect, the data field 640 includes MPDU sub-frames, each comprised of a delimiter field 655a-c, a media access control header 660a-c, and a MAC payload 670a-c respectively.

Figure 7:
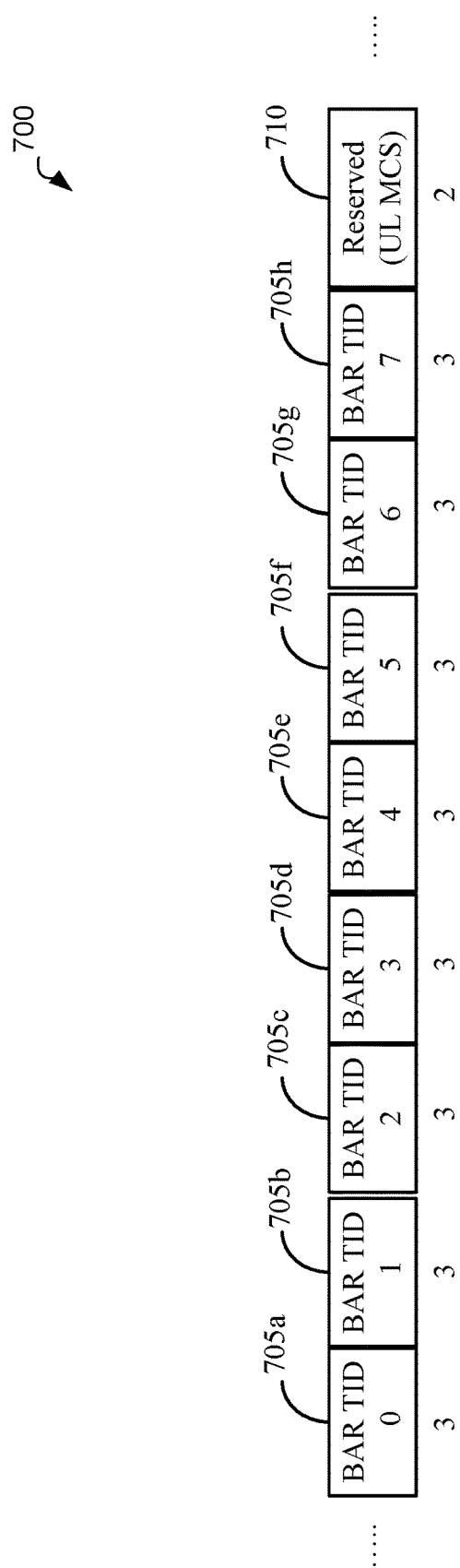
FIG. 7 shows an exemplary format of an acknowledgment type indication.

FIG. 7 shows an exemplary format of a portion of an acknowledgment type indication message 700. In some aspects, the portion 700 may be included in a high throughput (HT) control field of a media access control header, such as any of media access control headers 660a-c discussed above. In some aspects, the acknowledgment type indication discussed herein may control a portion or all of the fields shown with respect to FIG. 7.

The acknowledgment type indication 700 may include a block acknowledgment request indication for up to seven (7) different traffic identifiers, indicated as 705*a-h*. The acknowledgment type indication may also optionally include a reserved and/or uplink modulation and coding scheme indication field 710. Each of the fields 705*a-h* may be three bits long. However, the length of the fields 705*a-h* may vary by embodiment. The reserved field 710 may be two bits long in some aspects. In some aspects, the field 710 may be set by a transmitter of the indication 700 to indicate a modulation and coding scheme (MCS) for a response from the intended recipient of the acknowledgment type 700. Providing transmitter controls of the response MCS may mitigate power imbalance issues.

FIG. 8 provides exemplary values and definitions for the sub-fields 705*a-h* discussed above with respect to FIG. 7. As the fields 705*a-h* are three bits in length in the example of FIG. 7, values 0-7 are defined for the fields 705*a-h*.

The values for fields 705*a-h* may indicate in some aspects for each traffic identifier, whether no acknowledgments are requested for a particular TID (e.g. value of 0 in one of the sub-fields 705*a-h*), an immediate acknowledgement is requested for a particular TID (e.g. value of one (1) in the one of the sub-fields 705*a-h*), an implicit block acknowledgement is requested for a particular TID, and that the block acknowledgment should utilize 32 octets for acknowledging MPDUs (e.g. value of two (2) in one of the sub-fields 705*a-h*), an implicit block acknowledgement is requested for a particular TID, and that the block acknowledgment should utilize 64 octets for acknowledging MPDUs (e.g. value of three (3) in one of the sub-fields 705*a-h*), an implicit block acknowledgement is requested for a particular TID, and that the block acknowledgment should utilize 128 octets for acknowledging MPDUs, (e.g. value of four (4) in one of the sub-fields 705*a-h*), an implicit block acknowledgement is requested for a particular TID, and that the block acknowledgment should utilize 256 octets for acknowledging MPDUs, (e.g. value of five (5) in one of the sub-fields 705*a-h*), an implicit block acknowledgement is requested for a particular TID, and that the block acknowledgment should utilize 64 octets for acknowledging MPDUs, and that fragmentation at level 3 is enabled or turned on (e.g. value of six (6) in one of the sub-fields 705*a-h*), or optionally an implicit block acknowledgement is requested for a particular TID, and that the block acknowledgment should utilize 256 octets for acknowledging MPDUs, and that fragmentation at level 3 is on (e.g. value of seven (7) in one of the sub-fields 705*a-h*).

Figure 9:
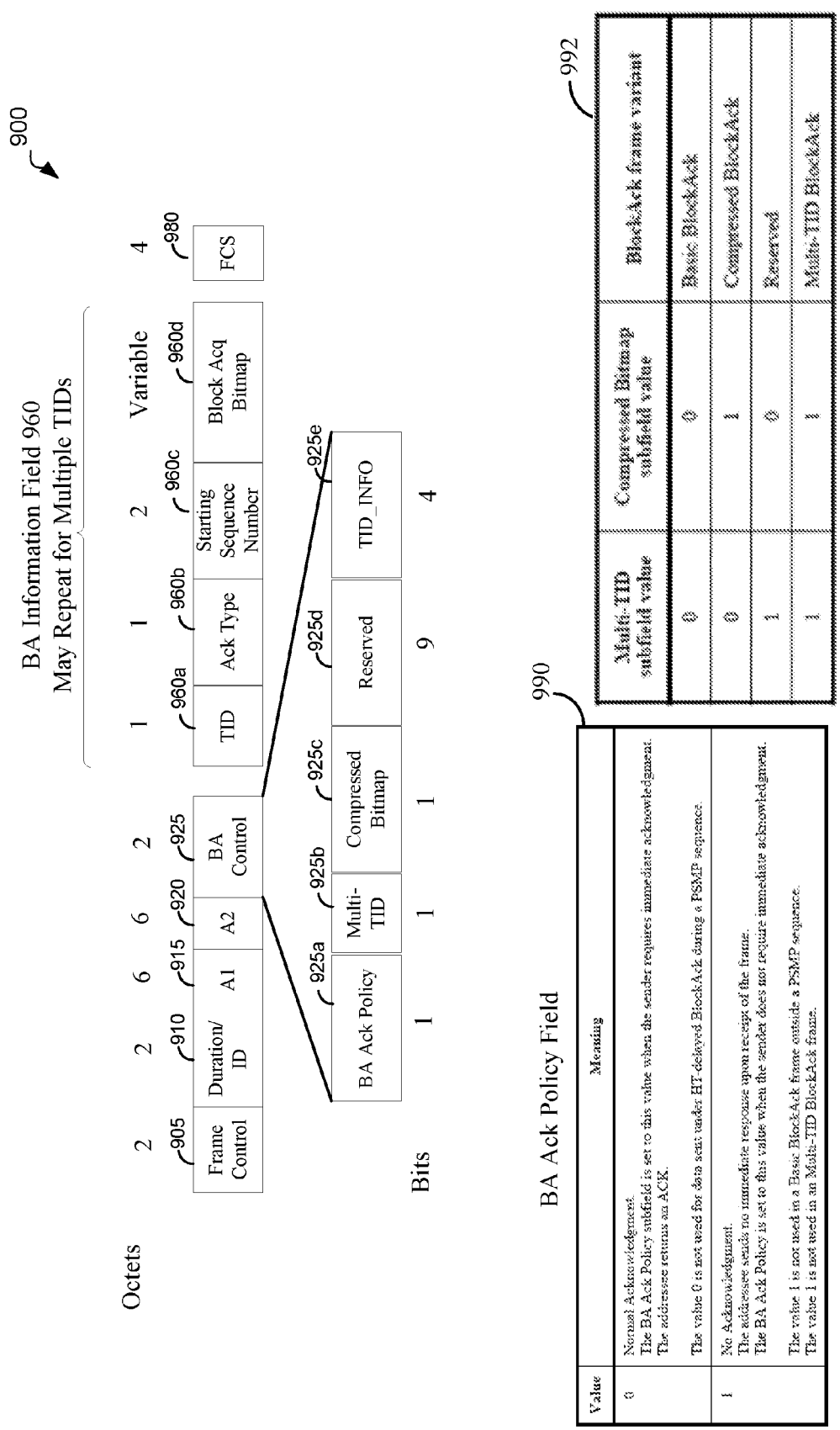
FIG. 9 is an exemplary format of a block acknowledgment frame.

FIG. 9 is an exemplary format of a block acknowledgment frame. The block acknowledgment frame 900 may include a frame control field 905, duration/ID field 910, first address field (A1) 915, second address field (A2) 920, block acknowledgment control field 925, a variable length block information field 960, which may repeat for multiple traffic identifiers, and a frame check sequence 980.

Each block information field 960 may include a traffic identifier field 960*a*, acknowledgment type field 960*b*, starting sequence number field 960*c*, and a variable sized block acknowledgment bitmap field 960*d*. The length of the block acknowledgment bitmap field 960*d* for a particular traffic identifier may be configured via the acknowledgment type 700 described above with respect to FIG. 7.

The block acknowledgment control field 925 may include one or more fields, including a block acknowledgment policy field 925*a*, multi-TID field 925*b*, compressed bitmap field 925*c*, reserved field 925*d*, and TID INFO field 925*e*. Possible values and their definitions for the block acknowledgment policy field 925*a* are provided in table 990. Possible values and their definitions for the multi-TID field 925*b* and compressed bitmap field 925*c* are provided by table 992.

Figure 10:
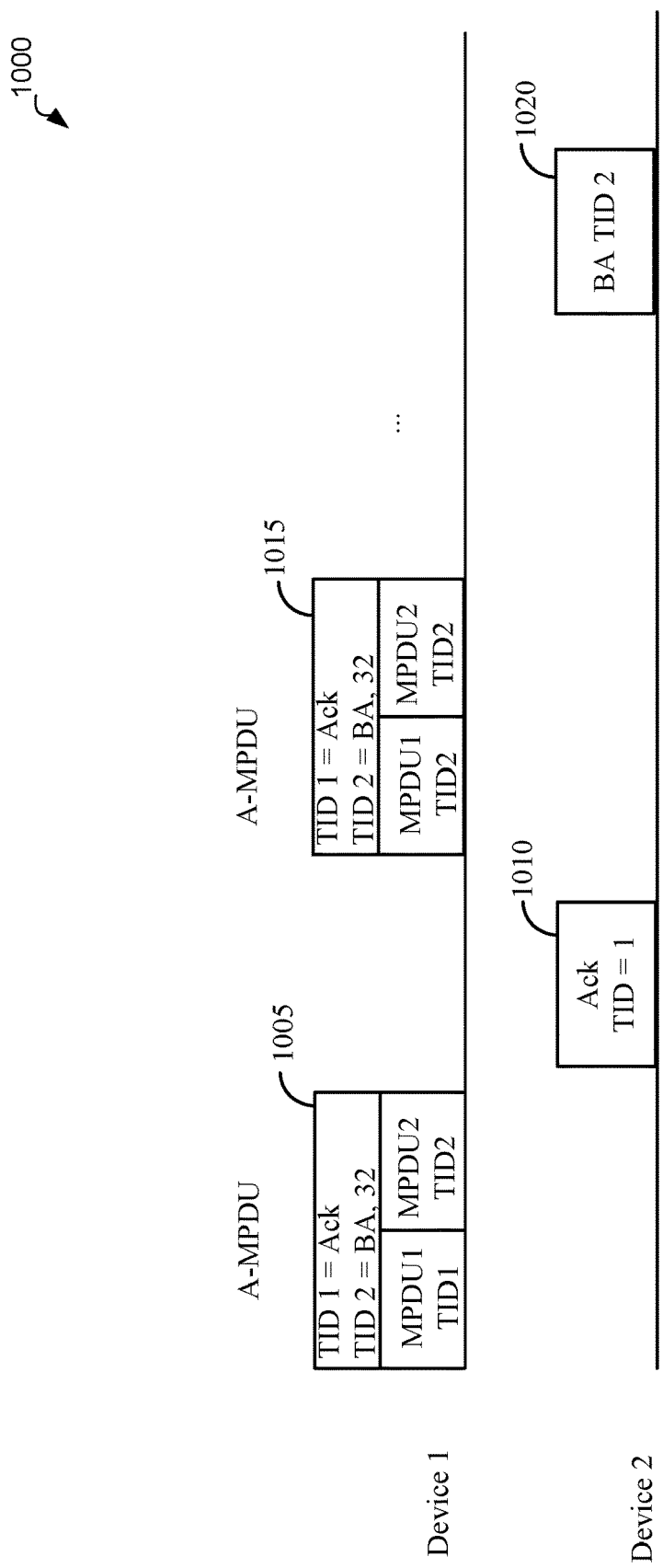
FIG. 10 is an exemplary timing diagram of a message exchange in one embodiment of the disclosed methods and systems.

FIG. 10 is an exemplary timing diagram of a message exchange in one embodiment of the disclosed methods and systems. The timing diagram 1000 shows a first A-MPDU 1005 is transmitted by a first device. The first A-MPDU 1005 includes two MPDUs, each with a different traffic identifier (shows as TIDs 1 and 2). The A-MPDU 1005 also indicates a type for block acknowledgments for each of the traffic identifiers. A-MPDU 1005 indicates that MPDU's for TID 1 should be acknowledged with a single acknowledgment, for example, as shown by a value of one (1) in FIG. 8. A-MPDU 1005 also shows MPDU's for TID 2 are to be acknowledged using a block acknowledgment, with a maximum number of octets for use in acknowledgments at 32, for example, as shown by value two (2) in FIG. 8. The A-MPDU may be addressed to device 2, in other words, destination address fields in MAC headers in the two MPDUs within A-MPDU 1005 may identify device 2, via device 2's station address or other address.

After transmission of the A-MPDU to device 2, device 2 may acknowledge the MPDU for TID 1, given the acknowledgment type for TID 1 was indicated as acknowledgment in the A-MPDU 1005. As the acknowledgment type for TID 2 was indicated as block acknowledgment, with a maximum number of octets used for acknowledgment set to 32 in A-MPDU 1005, no block acknowledgment is immediately transmitted by device 2 in response to reception of the A-MPDU 1005. Later, device 1 may transmit one or more additional A-MPDUs, such as A-MPDU 1015 shown in FIG. 10.

The transmission of these additional A-MPDU's may cause device 2 to reach a threshold with regard to acknowledging MPDUs from device 1. As such, device 2 may transmit block acknowledgment 1020 in accordance with the acknowledgment type for traffic identifier 2 defined by the A-MPDU 1005 and/or 1015. For example, block acknowledgment 1020 may include provision for acknowledging up to 4 MPDUs, per the acknowledgment type indicated by A-MPDU 1005 and/or 1015 (32/8 bits per MPDU).

Figure 11:
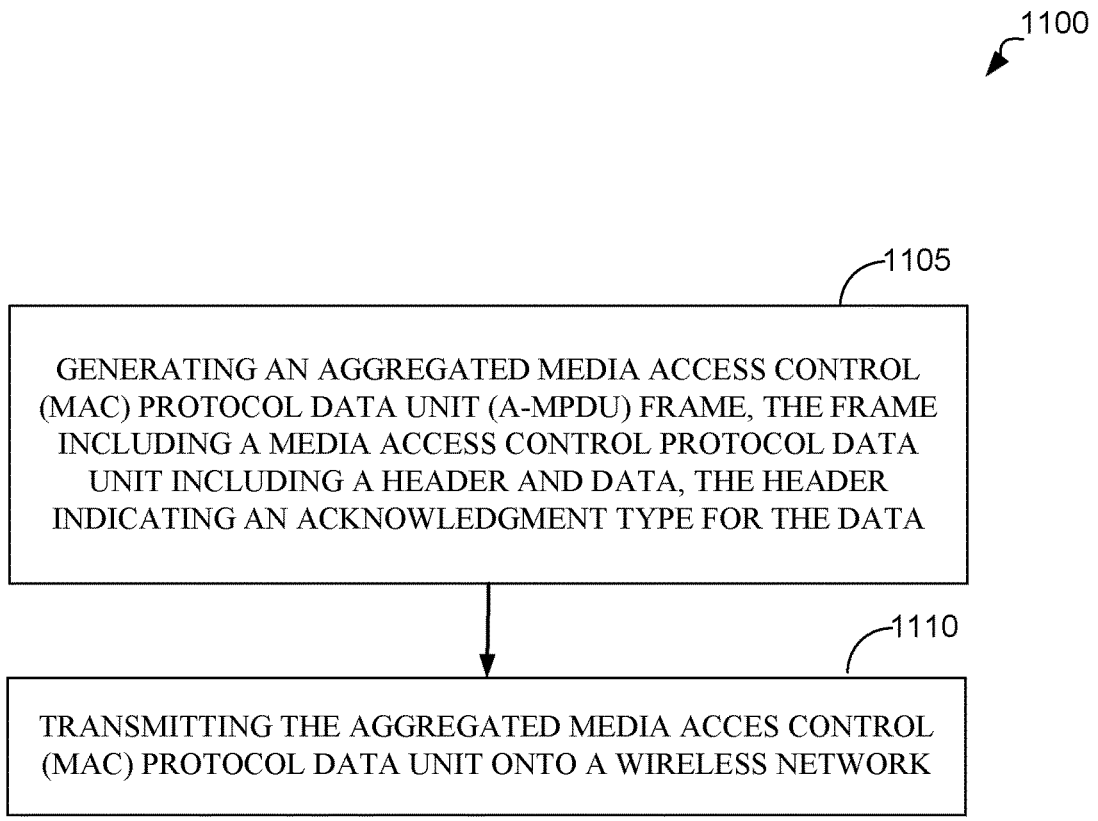
FIG. 11 is a flowchart of a method of wireless communication.

FIG. 11 is a flowchart of a method of wireless communication. In some aspects, process 1100 discussed below with respect to FIG. 11 may be performed by the device 302. For example, in some aspects, instructions in the memory 306 may configure the processor 304 to perform one or more of the functions discussed below with respect to process 900.

Process 1100 may provide more flexibility than some known block acknowledgment designs. For example, maintaining the same block acknowledgment size during an entire block acknowledgment session may be suboptimal when a typical PPDU size is relatively small, for example, less than thirty two. An acknowledgment that covers a large number of MPDUs provides a sub-optimal use of the medium. Additional each station on a wireless network may have negotiated a different block acknowledgment length. Thus, before an access point can respond to a station, the AP may be required to look up the proper block acknowledgment configuration to utilize when communicating with a particular STA. Given that an access point may need to respond to the STA within a SIFS time, there may be challenges when implementing an AP that can respond in such a short time frame while also needing to look up particular block acknowledgement configuration parameters for a particular STA to which it is responding. To address these problems, process 900 provides a mechanism under which a transmitter of a frame can solicit the length of the corresponding acknowledgment via a header in an A-MPDU. Thus, the configuration of acknowledgments for a particular traffic identifier may be changed dynamically whenever the transmitter deems it necessary, and need not be delayed until a new acknowledgment configuration can be negotiated.

In block 1105, an aggregated media access control protocol data unit (A-MPDU) is generated. The A-MPDU may be generated to include one or more MPDU frames, for example, as shown with respect to A-MPDU 600 in FIG. 6. Each of the MPDU's included in the A-MPDU may include a header portion and a data portion. The header portion may be a media access control (MAC) header, such as a header similar to mac header 450 shown with respect to FIG. 4 and/or any one of the mac headers 660*a-c* shown in FIG. 6.

The header within the A-MPDU includes an indication as to a type of a block acknowledgment for the A-MPDU, or sub-frames within the A-MPDU. For example, in some aspects, the HT control field 560 shown with respect to FIG. 5 may include the indication. In some aspects, the HT control field 560 may be redefined from previously known formats to implement field 700 shown with respect to FIG. 7. Thus, using the exemplary embodiment of fields 705*a-h* discussed with respect to FIGS. 7 and 8, the media access control header may indicate a maximum number of MPDUs that may be acknowledged by the block acknowledgement. For example, by indicating a block acknowledgement using 32, 64, 128, or 256 octets for acknowledging MPDUs, the indication defines a maximum number of MPDU's that may be acknowledged.

In some aspects, the A-MPDU includes multiple MPDUs indicating different traffic identifiers. For example, in some aspects, the QOS control field 555 shown in MAC header 450 of FIG. 5 may indicate a traffic identifier for the MPDU containing the MAC header. In some aspects, bits 0-3 (i.e. the four lowest order bits) indicate the traffic identifier (TID). Therefore, in some aspects, the different QOS control fields in the multiple different MPDUs may provide different traffic identifier indications. In some aspects, the header may indicate different acknowledgment types for the different traffic identifiers for MPDU's included in the A-MPDU. For example, as shown with respect to FIG. 7, the media access control header may include at least a portion of the field 700. Thus, the media access control header may include separate acknowledgment types for separate traffic identifiers (such as examples TID 0-7 in FIG. 7).

As shown with respect to FIG. 8, the media access control header may indicate, in some aspects for each traffic identifier, whether no acknowledgments are requested for a particular TID (e.g. value of 0 in one of the sub-fields 705*a-h*), an immediate acknowledgement is requested for a particular TID (e.g. value of one (1) in the one of the sub-fields 705*a-h*), an implicit block acknowledgement is requested for a particular TID, and that the block acknowledgment should utilize 32 octets for acknowledging MPDUs (e.g. value of two (2) in one of the sub-fields 705*a-h*), an implicit block acknowledgement is requested for a particular TID, and that the block acknowledgment should utilize 64 octets for acknowledging MPDUs, (e.g. value of three (3) in one of the sub-fields 705*a-h*), an implicit block acknowledgement is requested for a particular TID, and that the block acknowledgment should utilize 128 octets for acknowledging MPDUs, (e.g. value of four (4) in one of the sub-fields 705*a-h*), an implicit block acknowledgement is requested for a particular TID, and that the block acknowledgment should utilize 256 octets for acknowledging MPDUs, (e.g. value of five (5) in one of the sub-fields 705*a-h*), an implicit block acknowledgement is requested for a particular TID, and that the block acknowledgment should utilize 64 octets for acknowledging MPDUs, and that fragmentation at level 3 is enabled or turned on (e.g. value of six (6) in one of the sub-fields 705*a-h*), or optionally an implicit block acknowledgement is requested for a particular TID, and that the block acknowledgment should utilize 256 octets for acknowledging MPDUs, and that fragmentation at level 3 is on (e.g. value of seven (7) in one of the sub-fields 705*a-h*). In some aspects, one or more of the indications discussed above may be provided in the HT-Control field 560, discussed above with respect to FIG. 5. For example, in some aspects, the HT-Control field 560 may include at least a portion of the fields 705*a-h* and 710 shown in FIG. 7.

In block 1110, the A-MPDU is transmitted onto the network. In some aspects, each MPDU within the A-MPDU includes the same destination address, for example, in the A1 field 530. In some aspects, a device identified by the destination address may transmit a block acknowledgment according to the indicated acknowledgment type back to the device performing process 1100. The device performing process 1100 may receive the block acknowledgment. The device may then decode the block acknowledgment according to the indicated acknowledgment type. In some aspects, the block acknowledgement may conform to the format described above with respect to block acknowledgment 900 of FIG. 9. In some aspects, decoding the acknowledgment according to the indicated acknowledgment type may include determining whether the received block acknowledgment is acknowledging one or more of up to a maximum number of MPDUs, based on the use of 32, 64, 128, or 256 octets for acknowledging of MPDUs, depending on the indicated acknowledgment type.

Figure 12:
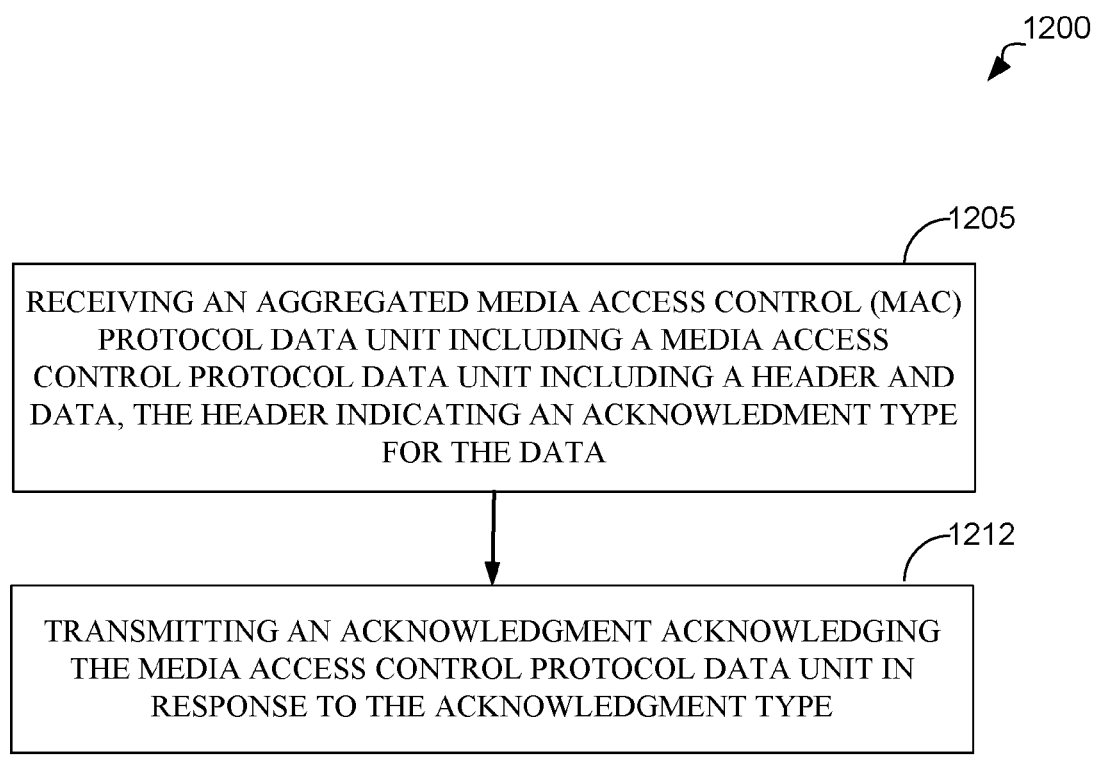
FIG. 12 is a flowchart of a process for acknowledging a message received from a wireless network.

FIG. 12 is a flowchart of a process for acknowledging a message received from a wireless network. In some aspects, process 1200 discussed below may be performed by the device 302. For example, memory 306 may store instructions in some aspects that configure the processor 304 to perform one or more of the functions discussed below with respect to process 1200.

As discussed above, in some aspects, it may be desirable for a transmitter to configure a type of block acknowledgement that should be provided for a particular message. In some aspects, this may enable an access point to process an acknowledgment type or format that is common across at least a majority of devices with which the access point is performing communications. Thus, there may not be a need to determine an acknowledgment type or format after reception of a message from a particular device but before an acknowledgment is transmitted. This may be particularly helpful when the access point is challenged to respond to the received message within a time limit imposed by a wireless communication standard, such as within a short inter-frame-space time (SIFS).

In some aspects, upon receiving an indication of an acknowledgment type in an A-MPDU, the receiving device may respond with a compressed block acknowledgment if only one of the acknowledgment types (such as each of sub-fields 705*a-h* of FIG. 7) indicated in the A-MPDU indicates a block acknowledgment request for multiple MPDUs.

In block 1205, an aggregated media access control (MAC) protocol data unit (A-MPDU) is received. The A-MPDU includes one or more media access control protocol data units. Each of the media access control protocol data units includes a header portion and a data portion. The header portion may be a media access control (MAC) header, such as for example that shown in FIGS. 4-5 as MAC header 450.

The header portion includes an indication, such as a field or certain bits of the header, that indicate an acknowledgment type used for acknowledging at least one of the MPDU's included in the received A-MPDU. In some aspects, the block acknowledgement type indication is provided in the HT-Control field 560, as shown above with respect to FIG. 5.

In some aspects, the type indication indicates a maximum number of MPDUs that can be acknowledged by the block acknowledgment. For example, in some aspects, the type may indicate whether the block acknowledgment acknowledges individual MPDUs using 32, 64, 128, or 256 octets. The maximum number of MPDUs may be derived from the number of octets used to acknowledgment the multiple MPDUs. For example, if each sequence number used to acknowledge an MPDU is 8 bits in length, than the use of 32 octets provides for a maximum of four MPDUs to be acknowledged. Thus, the size of the block acknowledgment may scale with the maximum number of MPDUs that can be acknowledged. In some aspects, the type may also indicate whether fragmentation at level 3 is enabled or not.

In some aspects, the header may be decoded to determine acknowledgment types for a plurality of traffic identifiers. In some aspects, each of these traffic identifiers may be associated with one or more MPDUs included in the A-MPDU. In some aspects, the block acknowledgement type may be decoded to determine a separate maximum number of MPDUs that can be acknowledged in common or separate block acknowledgments for the different traffic identifiers. For example, the received A-MPDU may indicate that data for a first traffic identifier may be acknowledged in a block acknowledgment having a bitmap field 960d of a first length, while data for a second traffic identifier may be acknowledged by a block acknowledgment having a bitmap field 960d of a second length. For example, in some aspects, the type indication of the header discussed above may take the form of at least a portion of field 700, discussed above with respect to FIG. 7. Values and definitions of the sub-fields 705a-h may conform to the exemplary definitions provided with respect to FIG. 8 in some aspects.

In block 1210, an acknowledgment acknowledging at least one of the media access control (MAC) protocol data units is transmitted in response to the acknowledgment type. In other words, the acknowledgment is generated in accordance with the type indicated in the A-MPDU. For example, if the decoded acknowledgment type indicates that block acknowledgments utilizing 32, 64, 128, or 256 octets may acknowledge MPDUs, then the acknowledgment transmitted in block 1210 may be a block acknowledgment and include the indicated number of octets. Similarly, if the acknowledgment type indicates that an immediate acknowledgment is requested (for example, via a value of one (1) as shown in the exemplary implementation described by FIG. 8), then block 1210 may provide an acknowledgment immediately upon reception of the MPDU. When block acknowledgments are indicated, the receiving device may delay acknowledgment of the received A-MPDU or MPDUs within the A-MPDU until a larger threshold of received MPDUs has been reached (or a maximum elapsed time has occurred). For example, if the acknowledgment type received indicates that a maximum of N MPDUs can be acknowledged via a block acknowledgment, then the receiving device may wait until up to N MPDUs are received (or a maximum time threshold is reached) before transmitting the block acknowledgment in block 1210. In some aspects, the block acknowledgment may at least partially conform with the format of block acknowledgment 900 discussed above with respect to FIG. 9.

In some aspects, an acknowledgment may be generated by block 1210 that acknowledges data for at least two different traffic identifiers, which may have been indicated in the received frame of block 1205. In some aspects, the acknowledgment type may be decoded to determine whether fragmentation at level 3 is enabled or disabled (turned on or off).

Figure 13:
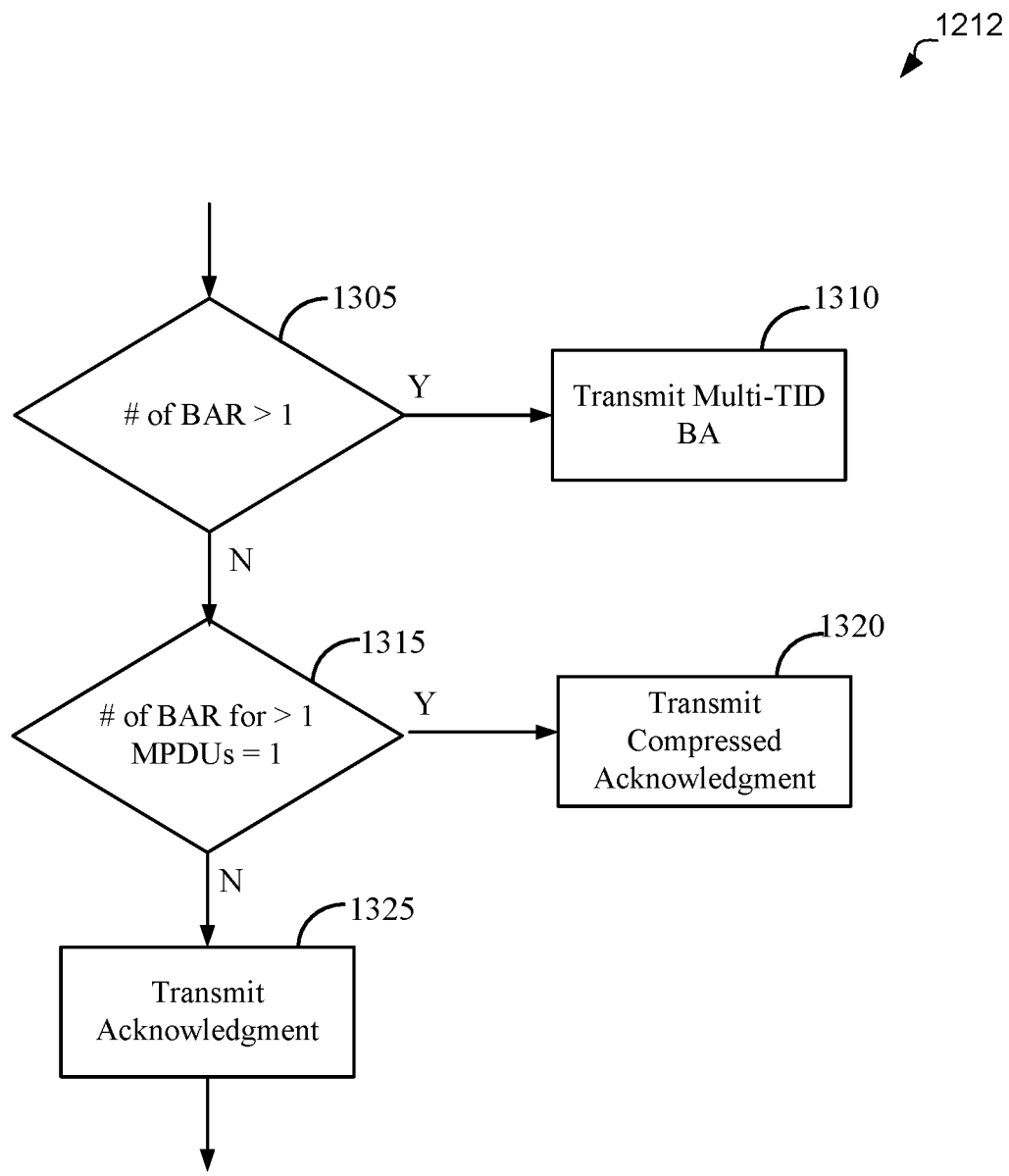
FIG. 13 is a flowchart of a method for acknowledging an MPDU.

FIG. 13 is a flowchart of a method for acknowledging an MPDU. For example, some embodiments of process 1200 discussed above may include one or more of the functions described with respect to FIG. 13 below within block 1212 of FIG. 12.

In some aspects, process 1212 described below may be performed by the device 302. For example, in some aspects, instructions stored in the memory 306 may configure the processor 304 to perform one or more of the functions discussed below with respect to process 1212.

Decision block 1305 determines a number of block acknowledgment requests requested by an acknowledgment type indicated in a received A-MPDU. For example, in some aspects, the number will count the number of sub-fields 705a-h with a value greater than one in embodiments utilizing the values and definition described with respect to FIG. 8. Decision block then determines whether the determined number is greater than one. In other words, is more than one traffic identifier configured to receive acknowledgments via block acknowledgments (e.g. per the acknowledgment type indication received in block 1205 of FIG. 12)?

If the number is greater than one, then process 1212 moves to block 1310, which transmits a multi-TID block acknowledgment. Transmitting a multi-TID block acknowledgment may including generating multiple block acknowledgment information fields, such as block acknowledgement information field 960 shown in FIG. 9B. For traffic identifiers configured for acknowledgment, for example, via an acknowledgment type 700, a block acknowledgment indication field 960 may be generated to include an acknowledgment type field 960b set to indicate an acknowledgment (e.g. a value of one (1) as indicated by the value of one in FIG. 8) if the MPDU for that TID was successfully received. In some aspects, the multi-TID block acknowledgment may include pad information for every non-received MPDU for a TID requesting acknowledgment (such as via a value of one (1) in FIG. 8). A more detailed example of this is discussed below with respect to FIG. 14.

Block 1310 may also include generating a block acknowledgment information field (such as field 960 of FIG. 9B) with an acknowledgment type field 960b set to indicate a block acknowledgment (e.g. value of zero (0)) for TIDs configured for block acknowledgments (e.g. via acknowledgment type 700). These block acknowledgment information fields may include a bitmap field 960d with a length in accordance with an indication from the acknowledgment type for the particular traffic identifier (e.g. 700).

Returning to decision block 1305, if the number of requested block acknowledgments is not greater than one, process 1212 moves to decision block 1315. Decision block 1315 determines if the number of traffic identifiers requesting block acknowledgements is equal to one. If the number of block acknowledgments is equal to one, process 1212 moves to block 1320, which transmits a compressed acknowledgment. Otherwise, process 1212 transmits an acknowledgment message (not a block acknowledgement message) in block 1325. One or more of blocks 1310, 1320, and/or 1325 may be partially or completely performed by the transmitter 310 in some aspects.

Figure 14:
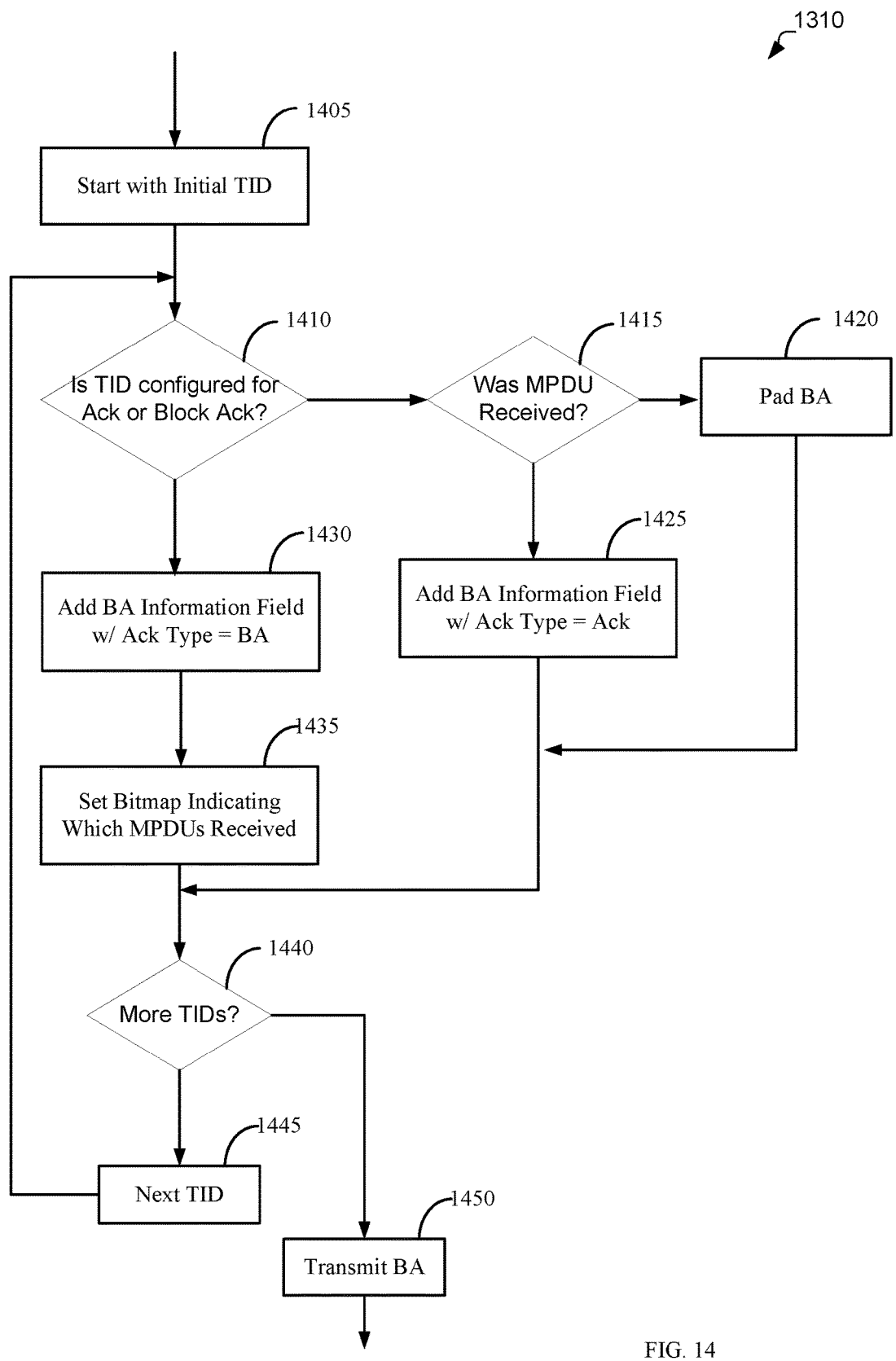
FIG. 14 is a flowchart of a method of generating and transmitting a block acknowledgment.

FIG. 14 is a flowchart of a method of generating and transmitting a block acknowledgment. In some aspects, process 1310 described with respect to FIG. 14 may be performed by block 1310 of process 1212, discussed above with respect to FIG. 13.

Block 1405 indicates that an initial TID is determined. In some aspects, the initial TID may be one of the TIDs identified by the acknowledgment type indicator 700 described above with respect to FIG. 7. Decision block 1410 determines whether the TID is configured for acknowledgment or block acknowledgment. For example, using the example values and definitions provided in FIG. 8 for the sub-fields 705*a-h* of FIG. 7, the TID may be configured for acknowledgment if the corresponding subfield 705 for the TID had a value of one (1). If the TID is configured for acknowledgment, process 1310 moves to block 1415, which determines whether an MPDU for the TID was received properly. If the MPDU was received properly, process 1310 moves to block 1425, which adds a block acknowledgment information field to a block acknowledgment message. For example, block 1425 may add a block information field 960 to the block acknowledgment message. The ack type field 960 may be set to indicate an acknowledgement, which is a value of one (or set) in some aspects. If the MPDU was not correctly received in block 1415, process 1310 transitions to block 1420, which may pad the block acknowledgment. In some aspects, padding the block acknowledgment may include adding a block acknowledgment information field (e.g. 960 of FIG. 9) of at least two bytes containing a sequence of zeros. This may provide that the length of the block acknowledgment is self-sustained. In some aspects, padding the block acknowledgment may include adding a block acknowledgment information field (e.g. 960 of FIG. 9) of at least two bytes that contains an acknowledgment control field.

Returning to the discussion of decision block 1410, if the TID is configured for block acknowledgment, a block acknowledgment information field, such as BA information field 960 discussed above with respect to FIG. 9, may be added to the multi-TID block acknowledgment. An acknowledgment type indication, such as acknowledgment type field 960*b* of BA information field 960 may be set to indicate a block acknowledgment (e.g. value of zero (0) in some aspects) in block 1430. In block 1435, the block acknowledgment bitmap is set to indicate which MPDUs have been successfully received for the traffic identifier. In some aspects, block 1435 may operate on field 960*d* of block acknowledgment information field 960, discussed above with respect to FIG. 9.

Each of blocks 1420, 1425, and 1435 transition to block 1440, which determines if there are more TIDs to process. If there are, the next TID for processing is identified in block 1445 and processing returns to decision block 1410. If there are no more TIDs, process 1310 transitions to block 1450 which transmits the block acknowledgement. Block 1450 may be performed, in some aspects, by the transmitter 310.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-7 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:
generating an aggregated media access control (MAC) protocol data unit (A-MPDU) frame, comprising:
a first MAC protocol data unit (MPDU) comprising a first MAC header including a first traffic identifier and indicating a first acknowledgment type for the first traffic identifier; and
a second MPDU comprising a second MAC header including a second traffic identifier and indicating a second acknowledgment type for the second traffic identifier, wherein the second traffic identifier is different than the first traffic identifier and the second acknowledgment type is different than the first acknowledgment type; transmitting the A-MPDU onto a wireless network;
receiving a first acknowledgement of the first MPDU for the first traffic identifier in accordance with a first number of bytes allocated for the first acknowledgement type; and receiving a second acknowledgement of the second MPDU for the second traffic identifier in accordance with a second number of bytes allocated for the second acknowledgement type.

2. The method of claim 1, the method further comprising:
receiving an acknowledgment for the A-MPDU; and
decoding the acknowledgment for the A-MPDU in accordance with the first and second acknowledgment types.

3. The method of claim 1, wherein the first and second MAC headers include a field indicating a number of bytes allocated for the first and second acknowledgements, the method further comprising:
decoding the acknowledgment in accordance with the number of allocated bytes.

4. The method of claim 3, wherein the A-MPDU indicates the first and second number of bytes.

5. The method of claim 1, wherein the first and second MAC headers comprise a plurality of indications of whether fragmentation is on or off for a corresponding plurality of traffic identifiers.

6. The method of claim 1, wherein the first and second MAC headers include a high throughput (HT)-control field, and the indications of the first and second acknowledgment types are included in the HT-control field.

7. A method of wireless communication, comprising:
receiving an aggregated media access control (MAC) protocol data unit (A-MPDU) frame, comprising:
a first MAC protocol data unit (MPDU) comprising a first MAC header including a first traffic identifier and indicating a first acknowledgment type for the first traffic identifier; and
a second MPDU comprising a second MAC header including a second traffic identifier and indicating a second acknowledgment type for the second traffic identifier, wherein the second traffic identifier is different than the first traffic identifier and the second acknowledgment type is different than the first acknowledgment type;
transmitting a first acknowledgement of the first MPDU for the first traffic identifier in accordance with a first number of bytes allocated for the first acknowledgement type; and
transmitting a second acknowledgement of the second MPDU for the second traffic identifier in accordance with a second number of bytes allocated for the second acknowledgement type.

8. The method of claim 7, the method further comprising:
decoding the first and second traffic identifiers.

9. The method of claim 8, wherein the first and second MAC headers include a field indicating a number of bytes allocated for the first and second acknowledgements, the method further comprising:
transmitting an acknowledgment for the A-MPDU in accordance with the first and second number of bytes.

10. The method of claim 9, further comprising:
allocating a separate number of bytes for each acknowledgment message; and
generating the acknowledgment messages in accordance with the allocated numbers of bytes.

11. The method of claim 7, further comprising:
decoding the first and second acknowledgment types to determine whether fragmentation is on or off; and
transmitting a block acknowledgment according to the determination of whether fragmentation is on or off.

12. The method of claim 7, wherein the first and second MAC headers include a plurality of indications of whether fragmentation is on or off for at least one of the first and second traffic identifiers, the method further comprising:
decoding the first and second acknowledgement types to determine whether fragmentation is on or off for the at least one traffic identifier; and
transmitting an acknowledgment of the at least one traffic identifier according to the determination of whether fragmentation is on or off.

13. An apparatus for wireless communication, comprising:
at least one processor;
at least one memory communicatively coupled with the at least one processor and storing processor-readable code that, when executed by the at least one processor, causes the apparatus to generate an aggregated media access control (MAC) protocol data unit (A-MPDU) frame, comprising:
a first MAC protocol data unit (MPDU) comprising a first MAC header including a first traffic identifier and indicating a first acknowledgment type for the first traffic identifier; and
a second MPDU comprising a second MAC header including a second traffic identifier and indicating a second acknowledgment type for the second traffic identifier, wherein the second traffic identifier is different than the first traffic identifier and the second acknowledgment type is different than the first acknowledgment type; a transmitter configured to transmit the A-MPDU onto a wireless network; and
a receiver configured to:
receive a first acknowledgement of the first MPDU for the first traffic identifier in accordance with a first number of bytes allocated for the first acknowledgement type; and
receive a second acknowledgement of the second MPDU for the second traffic identifier in accordance with a second number of bytes allocated for the second acknowledgement type.

14. The apparatus of claim 13, the receiver further configured to:
receive an acknowledgment for the A-MPDU, wherein execution of the processor-readable code further causes the apparatus to decode the acknowledgment for the A-MPDU in accordance with the first and second acknowledgment types.

15. The apparatus of claim 14, wherein the first and second MAC headers include a field indicating a number of bytes allocated for the first and second acknowledgements, wherein
execution of the processor-readable code further causes the apparatus to:
decode the acknowledgment in accordance with the number of allocated bytes.

16. The apparatus of claim 13, wherein the first and second MAC headers comprise a plurality of indications of whether fragmentation is on or off for a corresponding plurality of traffic identifiers, and wherein the first and second MAC headers include a high throughput (HT)-control field, and the indications of the first and second acknowledgment types are included in the HT-control field.

17. An apparatus for wireless communication, comprising:
a receiver configured to receive an aggregated media access control (MAC) protocol data unit (A-MPDU) frame, comprising:

a first MAC protocol data unit (MPDU) comprising a first MAC header including a first traffic identifier and indicating a first acknowledgment type for the first traffic identifier; and a second MPDU comprising a second MAC header including a second traffic identifier and indicating a second acknowledgment type for the second traffic identifier, wherein the second traffic identifier is different than the first traffic identifier and the second acknowledgment type is different than the first acknowledgment type; and a transmitter configured to:
    transmit a first acknowledgement of the first MPDU for the first traffic identifier in accordance with a first number of bytes allocated for the first acknowledgement type; and
    transmit a second acknowledgement of the second MPDU for the second traffic identifier in accordance with a second number of bytes allocated for the second acknowledgement type.

18. The apparatus of claim 17, further comprising:
at least one processor; and
at least one memory communicatively coupled with the at least one processor and storing processor-readable code that, when executed by the at least one processor, causes the apparatus to decode the first and second traffic identifiers.

19. The apparatus of claim 18, wherein the first and second MAC headers include a field indicating the first and second number of bytes, and wherein the transmitter is further configured to:
    transmit an acknowledgment for the A-MPDU in accordance with the first and second number of bytes.

20. The apparatus of claim 19, wherein execution of the processor-readable code further causes the apparatus to:
    allocate a separate number of bytes for each acknowledgment message; and
    generate the acknowledgment messages in accordance with the allocated numbers of bytes.

21. The apparatus of claim 18, wherein execution of the processor-readable code further causes the apparatus to decode the first and second acknowledgment types to determine whether fragmentation is on or off, wherein the transmitter is further configured to transmit a block acknowledgment according to the determination of whether fragmentation is on or off.

22. The apparatus of claim 17, wherein execution of the processor-readable code further causes the apparatus to decode the first and second acknowledgement types to determine whether fragmentation is on or off for the at least one traffic identifier, wherein the transmitter is further configured to transmit an acknowledgment of the at least one traffic identifier according to the determination of whether fragmentation is on or off.

23. A non-transitory computer readable storage medium comprising instructions that, when executed by one or more processors of an apparatus, cause the apparatus to perform a method of wireless communication, the method comprising:
    generating an aggregated media access control (MAC) protocol data unit (A-MPDU) frame, comprising:
        a first MAC protocol data unit (MPDU) comprising a first MAC header including a first traffic identifier and indicating a first acknowledgment type for the first traffic identifier; and
        a second MPDU comprising a second MAC header including a second traffic identifier and indicating a second acknowledgment type for the second traffic identifier, wherein the second traffic identifier is different than the first traffic identifier and the second acknowledgment type is different than the first acknowledgment type; transmitting the A-MPDU onto a wireless network;
    receiving a first acknowledgement of the first MPDU for the first traffic identifier in accordance with a first number of bytes allocated for the first acknowledgement type; and
    receiving a second acknowledgement of the second MPDU for the second traffic identifier in accordance with a second number of bytes allocated for the second acknowledgement type.

24. A non-transitory computer readable storage medium comprising instructions that, when executed by one or more processors of an apparatus, cause the apparatus to perform a method of wireless communication, the method comprising:
    receiving an aggregated media access control (MAC) protocol data unit (A-MPDU) frame, comprising:
        a first MAC protocol data unit (MPDU) comprising a first MAC header including a first traffic identifier and indicating a first acknowledgment type for the first traffic identifier; and
        a second MPDU comprising a second MAC header including a second traffic identifier and indicating a second acknowledgment type for the second traffic identifier, wherein the second traffic identifier is different than the first traffic identifier and the second acknowledgment type is different than the first acknowledgment type;
    transmitting a first acknowledgement of the first MPDU for the first traffic identifier in accordance with a first number of bytes allocated for the first acknowledgement type; and
    transmitting a second acknowledgement of the second MPDU for the second traffic identifier in accordance with a second number of bytes allocated for the second acknowledgement type.

* * * * *